US011252166B2

(12) United States Patent
Wei et al.

(10) Patent No.: US 11,252,166 B2
(45) Date of Patent: *Feb. 15, 2022

(54) PROVIDING DATA AUTHORIZATION BASED ON BLOCKCHAIN

(71) Applicant: Advanced New Technologies Co., Ltd., George Town (KY)

(72) Inventors: Changzheng Wei, Hangzhou (CN); Ying Yan, Hangzhou (CN); Hui Zhang, Hangzhou (CN); Yujun Peng, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/779,488

(22) Filed: Jan. 31, 2020

(65) Prior Publication Data

US 2020/0177604 A1 Jun. 4, 2020

Related U.S. Application Data

(63) Continuation of application No. PCT/CN2020/072153, filed on Jan. 15, 2020.

(30) Foreign Application Priority Data

Jul. 31, 2019 (CN) .......................... 201910703796.X

(51) Int. Cl.
*H04L 9/06* (2006.01)
*H04L 29/06* (2006.01)
(Continued)

(52) U.S. Cl.
CPC ........ *H04L 63/126* (2013.01); *G06F 16/2358* (2019.01); *H04L 9/0637* (2013.01);
(Continued)

(58) Field of Classification Search
CPC . H04L 2209/38; H04L 9/0637; H04L 9/3213; H04L 9/30; H04L 9/321;
(Continued)

(56) References Cited

U.S. PATENT DOCUMENTS 6,947,556 B1 * 9/2005 Matyas, Jr. ......... G06F 21/6209
380/281
9,838,203 B1 * 12/2017 Kisley ................... G06F 21/335
(Continued)

FOREIGN PATENT DOCUMENTS

| CN | 103034813 | 4/2013 |
| CN | 103765452 | 4/2014 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Ali S Abyaneh
(74) *Attorney, Agent, or Firm* — Fish & Richardson P.C.

(57) ABSTRACT

Disclosed herein are methods, systems, and apparatus, including computer programs encoded on computer storage media, for providing blockchain-based data authorization. One of the methods includes receiving, by a blockchain node, a data acquisition transaction submitted by a data user for obtaining target data possessed by a data owner, determining, by the blockchain node, that the data user has obtained authorization of the target data, and executing, by the blockchain node, a smart contract invoked by the data acquisition transaction to issue an authorization token to the data user in response to determining that the data user has authorization of the target data, where the authorization token is sent to a privacy computing platform.

18 Claims, 5 Drawing Sheets

(51) Int. Cl.
  *G06F 16/23* (2019.01)
  *H04L 9/32* (2006.01)
(52) U.S. Cl.
  CPC ........ *H04L 9/3234* (2013.01); *H04L 63/0442* (2013.01); *H04L 63/0485* (2013.01); *H04L 63/101* (2013.01); *H04L 63/105* (2013.01); *H04L 2209/38* (2013.01)
(58) Field of Classification Search
  CPC ............... H04L 63/0807; H04L 9/0618; H04L 63/0442; G06Q 20/401; G06Q 20/0658; G06Q 20/3672; G06F 21/64
  See application file for complete search history.

(56) References Cited

U.S. PATENT DOCUMENTS

| | | | |
|---|---|---|---|
| 10,248,783 B2 | 4/2019 | Costa Faidella | |
| 11,057,180 B2 | 7/2021 | Guan | |
| 2005/0223412 A1 | 10/2005 | Nadalin et al. | |
| 2006/0064464 A1* | 3/2006 | Kakivaya | H04L 1/1848 709/206 |
| 2014/0359348 A1 | 12/2014 | Volvovski et al. | |
| 2015/0172283 A1* | 6/2015 | Omnes | H04W 12/08 726/9 |
| 2015/0193263 A1 | 7/2015 | Nayyar et al. | |
| 2015/0228018 A1* | 8/2015 | Richman | G06Q 40/025 705/38 |
| 2015/0381575 A1 | 12/2015 | Bhargav-Spantzel et al. | |
| 2017/0081796 A1 | 3/2017 | Belveal | |
| 2017/0155515 A1 | 6/2017 | Androulaki | |
| 2017/0169250 A1* | 6/2017 | White | H04L 9/14 |
| 2017/0221029 A1 | 8/2017 | Lund | |
| 2017/0300627 A1 | 10/2017 | Giordano | |
| 2018/0060496 A1* | 3/2018 | Bulleit | H04L 9/3239 |
| 2018/0081529 A1 | 3/2018 | Zhang | |
| 2018/0152442 A1 | 5/2018 | Buldas et al. | |
| 2018/0183809 A1 | 6/2018 | Vadura | |
| 2018/0204213 A1 | 7/2018 | Zappier et al. | |
| 2018/0227119 A1 | 8/2018 | Bibera et al. | |
| 2018/0239897 A1 | 8/2018 | Ventura | |
| 2018/0240085 A1 | 8/2018 | Balachov | |
| 2018/0276626 A1 | 9/2018 | Laiben | |
| 2018/0314809 A1 | 9/2018 | Mintz et al. | |
| 2018/0293556 A1 | 10/2018 | Hyun et al. | |
| 2018/0309567 A1 | 10/2018 | Wooden | |
| 2019/0028277 A1 | 1/2019 | Jayachandran et al. | |
| 2019/0043043 A1 | 2/2019 | Saraniecki et al. | |
| 2019/0080392 A1 | 3/2019 | Youb et al. | |
| 2019/0081796 A1* | 3/2019 | Chow | H04L 9/30 |
| 2019/0116038 A1 | 4/2019 | Sprague | |
| 2019/0140822 A1 | 5/2019 | Xie et al. | |
| 2019/0164157 A1 | 5/2019 | Balaraman et al. | |
| 2019/0171744 A1 | 6/2019 | Ananthapur Bache et al. | |
| 2019/0179801 A1 | 6/2019 | Jang | |
| 2019/0197532 A1 | 6/2019 | Jayachandran et al. | |
| 2019/0205563 A1 | 7/2019 | Gonzales, Jr. | |
| 2019/0205894 A1 | 7/2019 | Gonzales, Jr. et al. | |
| 2019/0207750 A1 | 7/2019 | Harvey | |
| 2019/0207751 A1 | 7/2019 | Harvey | |
| 2019/0229921 A1 | 7/2019 | Pulsifer | |
| 2019/0251552 A1 | 8/2019 | Kurian | |
| 2019/0268139 A1 | 8/2019 | Kurian | |
| 2019/0294817 A1* | 9/2019 | Hennebert | G06F 16/1824 |
| 2019/0294822 A1 | 9/2019 | Hennebert | |
| 2019/0295202 A1 | 9/2019 | Mankovskii | |
| 2019/0334700 A1 | 10/2019 | Callan et al. | |
| 2019/0340352 A1 | 11/2019 | Peeters | |
| 2019/0342077 A1 | 11/2019 | McMurdie et al. | |
| 2019/0347725 A1 | 11/2019 | de Jong | |
| 2019/0354693 A1* | 11/2019 | Yoon | G06F 21/6245 |
| 2019/0358515 A1 | 11/2019 | Tran | |
| 2019/0362352 A1 | 11/2019 | Kunnawat | |
| 2019/0372776 A1 | 12/2019 | Kroneisen et al. | |
| 2019/0394179 A1 | 12/2019 | Androulaki | |
| 2020/0004737 A1 | 1/2020 | Qiu | |
| 2020/0005296 A1 | 1/2020 | Green | |
| 2020/0013046 A1 | 1/2020 | Joao | |
| 2020/0021439 A1 | 1/2020 | Sato | |
| 2020/0026834 A1 | 1/2020 | Vinnadalal | |
| 2020/0027169 A1 | 1/2020 | Valencia | |
| 2020/0034457 A1 | 1/2020 | Brody et al. | |
| 2020/0036519 A1* | 1/2020 | Bitauld | H04L 9/088 |
| 2020/0045019 A1 | 2/2020 | Huang | |
| 2020/0067907 A1 | 2/2020 | Avetisov et al. | |
| 2020/0074518 A1 | 3/2020 | Kunnaraswanny | |
| 2020/0082933 A1 | 3/2020 | Lu | |
| 2020/0084097 A1 | 3/2020 | Marks | |
| 2020/0118110 A1* | 4/2020 | Coverstone | G06Q 20/208 |
| 2020/0118131 A1 | 4/2020 | Diriye | |
| 2020/0119905 A1 | 4/2020 | Revankar | |
| 2020/0145229 A1 | 5/2020 | Li | |
| 2020/0210996 A1 | 7/2020 | Edwards et al. | |
| 2020/0219093 A1 | 7/2020 | Malhotra | |
| 2020/0226285 A1 | 7/2020 | Bulleit | |
| 2020/0227160 A1 | 7/2020 | Youngblood | |
| 2020/0272619 A1 | 8/2020 | Alferov | |
| 2020/0280443 A1 | 9/2020 | Simons | |
| 2020/0287874 A1 | 9/2020 | Bertram | |
| 2020/0302429 A1 | 9/2020 | Anton | |
| 2020/0304474 A1 | 9/2020 | Kisko | |
| 2020/0311052 A1 | 10/2020 | Takahashi | |
| 2020/0349261 A1 | 11/2020 | Koorella et al. | |
| 2020/0364358 A1 | 11/2020 | Karia et al. | |
| 2020/0380090 A1 | 12/2020 | Marion | |
| 2021/0097795 A1 | 4/2021 | Manchovski | |
| 2021/0216647 A1 | 7/2021 | Sarhaddar et al. | |

FOREIGN PATENT DOCUMENTS

| | | |
|---|---|---|
| CN | 108235772 | 6/2016 |
| CN | 106600405 | 4/2017 |
| CN | 107391944 | 11/2017 |
| CN | 107453865 | 12/2017 |
| CN | 107483211 | 12/2017 |
| CN | 108985089 | 2/2018 |
| CN | 107942718 | 4/2018 |
| CN | 108234515 | 6/2018 |
| CN | 108632268 | 10/2018 |
| CN | 108681898 | 10/2018 |
| CN | 108881160 | 11/2018 |
| CN | 108932297 | 12/2018 |
| CN | 109033846 | 12/2018 |
| CN | 109034833 | 12/2018 |
| CN | 109067791 | 12/2018 |
| CN | 109190410 | 1/2019 |
| CN | 109214197 | 1/2019 |
| CN | 109274640 | 1/2019 |
| CN | 109344647 | 2/2019 |
| CN | 109347941 | 2/2019 |
| CN | 109450910 | 3/2019 |
| CN | 109635585 | 4/2019 |
| CN | 109636503 | 4/2019 |
| CN | 109639643 | 4/2019 |
| CN | 109949155 | 6/2019 |
| CN | 109977697 | 7/2019 |
| CN | 110011996 | 7/2019 |
| CN | 110032865 | 7/2019 |
| CN | 110060162 | 7/2019 |
| CN | 110457875 | 11/2019 |
| CN | 110473094 | 11/2019 |
| CN | 110473096 | 11/2019 |
| EP | 3547203 | 2/2019 |
| TW | 201724825 | 7/2017 |
| TW | 201730825 | 9/2017 |
| TW | 201730829 | 9/2017 |
| TW | 201732666 | 9/2017 |
| TW | 201732700 | 9/2017 |
| TW | 201812674 | 4/2018 |
| TW | M561279 | 6/2018 |
| TW | 201824108 | 7/2018 |
| TW | 201828200 | 8/2018 |
| TW | 201842476 | 12/2018 |
| TW | 201909002 | 3/2019 |

(56) References Cited

FOREIGN PATENT DOCUMENTS

| TW | 201909084 | 3/2019 |
|---|---|---|
| TW | 201914254 | 4/2019 |
| WO | WO 2019078879 | 4/2019 |

OTHER PUBLICATIONS

Nakamoto, "Bitcoin: A Peer-to-Peer Electronic Cash System," www.bitcoin.org, 2005, 9 pages.

International Search Report and Written Opinion in International Application No. PCT/CN2020/072038, dated Apr. 26, 2020, 19 pages (with Machine Translation).

International Search Report and Written Opinion in International Application No. PCT/CN2020/072153, dated May 8, 2020, 18 pages (with Machine Translation).

International Search Report and Written Opinion in International Application No. PCT/CN2020/072224, dated Apr. 24, 2020, 25 pages (with Machine Translation).

Jesus et al., "A Survey of How to Use Blockchain to Secure Internet of Things and the Stalker Attack", Article ID 9675050, 27 pages, 2018.

Jin et al., "Bspace: a group workspace over the Ethereum blockchain with off-blockchain storage", 9(40): 53-60, 2019.

Khezr et al., "Blockchain Technology in Healthcare: A Comprehensive Review and Directions for Future Research,", 9(9): 28 pages, 2019.

\* cited by examiner

| User ID | ENC($K_{Ua}$, $K_{TEMP}$) | ENC($K_M$, $K_{TEMP}$) | Authorization content | TAG |

MAC=C($K_M$, MG)

PROVIDING DATA AUTHORIZATION BASED ON BLOCKCHAIN

CROSS-REFERENCE TO RELATED APPLICATIONS

This application is a continuation of PCT Application No. PCT/CN2020/072153, filed on Jan. 15, 2020, which claims priority to Chinese Patent Application No. 201910703796.X, filed on Jul. 31, 2019, and each application is hereby incorporated by reference in its entirety.

TECHNICAL FIELD

One or more implementations of the present specification relate to the field of blockchain technologies, and in particular, to a blockchain-based data authorization method and apparatus.

BACKGROUND

A blockchain technology (also referred to as a distributed ledger technology) is a decentralized distributed database technology, and is characterized by decentralization, openness and transparency, tamper-resistance, trustworthiness, etc., and therefore, is applicable to many application scenarios that require high data reliability.

SUMMARY

In view of this, one or more implementations of the present specification provide a blockchain-based data authorization method and apparatus.

To achieve the previous objective, one or more implementations of the present specification provide the following technical solutions:

According to a first aspect of one or more implementations of the present specification, a blockchain-based data authorization method is provided, and includes the following: receiving, by a blockchain node, a data acquisition transaction submitted by a data user, where the data acquisition transaction is used to request to obtain target data held by a data owner; and executing, by the blockchain node, a data authorization smart contract invoked to perform the data acquisition transaction, where the data authorization smart contract is used to issue an authorization token to the data user when it is confirmed that the data user is authorized, and after being provided by the data user to a privacy computing platform, the authorization token is used to instruct the privacy computing platform to obtain the target data and return at least one of the target data and an operation result obtained after a predetermined operation is performed on the target data to the data user.

According to a second aspect of one or more implementations of the present specification, a blockchain-based data authorization method is provided, and includes the following: obtaining, by a privacy computing platform, an authorization token provided by a data user, where the authorization token is issued by a data authorization smart contract in a blockchain to the data user, to indicate that the data user is authorized for target data held by a data owner; and obtaining, by the privacy computing platform, the target data, so as to return at least one of the target data and an operation result obtained after a predetermined operation is performed on the target data to the data user.

According to a third aspect of one or more implementations of the present specification, a blockchain-based data authorization apparatus is provided, and includes the following: a receiving unit, configured to enable a blockchain node to receive a data acquisition transaction submitted by a data user, where the data acquisition transaction is used to request to obtain target data held by a data owner; and an execution unit, configured to enable the blockchain node to execute a data authorization smart contract invoked to perform the data acquisition transaction, where the data authorization smart contract is used to issue an authorization token to the data user when it is confirmed that the data user is authorized, and after being provided by the data user to a privacy computing platform, the authorization token is used to instruct the privacy computing platform to obtain the target data and return at least one of the target data and an operation result obtained after a predetermined operation is performed on the target data to the data user.

According to a fourth aspect of one or more implementations of the present specification, a blockchain-based data authorization apparatus is provided, and includes the following: a token acquisition unit, configured to enable a privacy computing platform to obtain an authorization token provided by a data user, where the authorization token is issued by a data authorization smart contract in a blockchain to the data user, to indicate that the data user is authorized for target data held by a data owner; and a data acquisition unit, configured to enable the privacy computing platform to obtain the target data, so as to return at least one of the target data and an operation result obtained after a predetermined operation is performed on the target data to the data user.

According to a fifth aspect of one or more implementations of the present specification, an electronic device is provided, and includes the following: a processor; and a memory, configured to store an instruction that can be executed by the processor, where the processor runs the executable instruction to implement the method according to the first aspect.

According to a sixth aspect of one or more implementations of the present specification, a computer-readable storage medium is provided, where the computer-readable storage medium stores a computer instruction, and when the instruction is executed by a processor, the steps in the method according to the first aspect are implemented.

According to a seventh aspect of one or more implementations of the present specification, an electronic device is provided, and includes the following: a processor; and a memory, configured to store an instruction that can be executed by the processor, where the processor runs the executable instruction to implement the method according to the second aspect.

According to an eighth aspect of one or more implementations of the present specification, a computer-readable storage medium is provided, where the computer-readable storage medium stores a computer instruction, and when the instruction is executed by a processor, the steps in the method according to the second aspect are implemented.

DESCRIPTION OF IMPLEMENTATIONS

Example implementations are described in detail here, and examples of the example implementations are presented in the accompanying drawings. When the following description relates to the accompanying drawings, unless specified otherwise, same numbers in different accompanying drawings represent same or similar elements. Implementations described below do not represent all implementations consistent with one or more implementations of the present specification. On the contrary, the implementations are only examples of apparatuses and methods that are described in the appended claims in detail and consistent with some aspects of one or more implementations of the present specification.

It is worthwhile to note that in other implementations, steps of a corresponding method are not necessarily performed according to the sequence shown and described in the present specification. In some other implementations, the method may include more or less steps than those described in the present specification. In addition, a single step described in the present specification may be divided into a plurality of steps in other implementations for description. However, a plurality of steps described in the present specification may also be combined into a single step for description in other implementations.

Figure 1:
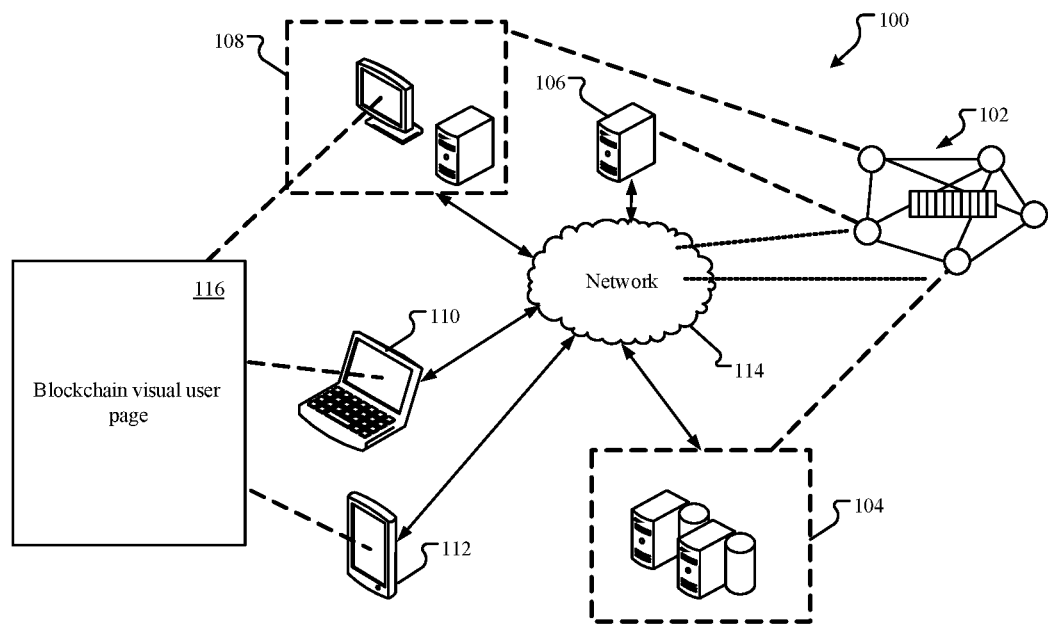
FIG. 1 is a schematic diagram illustrating an example environment, according to an example implementation.

FIG. 1 is a schematic diagram illustrating an example environment, according to an example implementation. As shown in FIG. 1, an entity is allowed to participate in a blockchain network 102 in an example environment 100. The blockchain network 102 can be a public blockchain network, a private blockchain network, or a consortium blockchain network. The example environment 100 can include computing devices 104, 106, 108, 110, and 112, and a network 114. In an implementation, the network 114 can include a local area network (LAN), a wide area network (WAN), the Internet, or a combination of LAN, WAN and Internet, and is connected to a website, user equipment (e.g., a computing device), and a backend system. In an implementation, the network 114 can be accessed through at least one of wired communication or wireless communication.

In some situations, the computing devices 106 and 108 can be nodes (not shown) in a cloud computing system, or each of the computing devices 106 and 108 can be a standalone cloud computing system, including a plurality of computers interconnected through a network and operating as a distributed processing system.

In an implementation, the computing devices 104 to 108 can run any suitable computing system, so as to serve as nodes in the blockchain network 102. For example, the computing devices 104 to 108 can include but are not limited to a server, a desktop computer, a notebook computer, a tablet, and a smartphone. In an implementation, the computing devices 104 to 108 can belong to a related entity and are configured to implement a corresponding service. For example, the service can be used to manage a transaction of one entity or a transaction between a plurality of entities.

In an implementation, each of the computing devices 104 to 108 stores a blockchain ledger corresponding to the blockchain network 102. The computing device 104 can be (or include) a network server configured to provide a browser function, and the network server can provide visual information related to the blockchain network 102 based on the network 114. In some situations, the computing device 104 may not participate in block verification, but monitor the blockchain network 102 to determine when other nodes (e.g., the computing devices 106 and 108) reach a consensus, and therefore, generate a corresponding blockchain visual user page if other nodes reach a consensus.

In an implementation, the computing device 104 can receive a request from a client (e.g., the computing device 110 or the computing device 112) for the blockchain visual user page. In some situations, a node in the blockchain network 102 can also serve as a client. For example, a user of the computing device 108 can send the request to the computing device 104 by using a browser running on the computing device 108.

In response to the request, the computing device 104 can generate the blockchain visual user page (e.g., a webpage) based on the stored blockchain ledger, and send the blockchain visual user page generated to the requesting client. If the blockchain network 102 is a private blockchain network or a consortium blockchain network, the request for the blockchain visual user page can include user authorization information. Before generating the blockchain visual user page and sending the blockchain visual user page to the requesting client, the computing device 104 can perform verification on the user authorization information, and return the corresponding blockchain visual user page after the verification succeeds.

The blockchain visual user page can be displayed on the client (e.g., a user interface 116 shown in FIG. 1). When the blockchain ledger is updated, display content on the user interface 116 can be updated accordingly. In addition, interaction between the user and the user interface 116 can result in a request for another user interface, for example, displaying a block list, block details, a transaction list, transaction details, an account list, account details, a contract list, contract details, or a search result page generated after the user searches the blockchain network.

Figure 2:
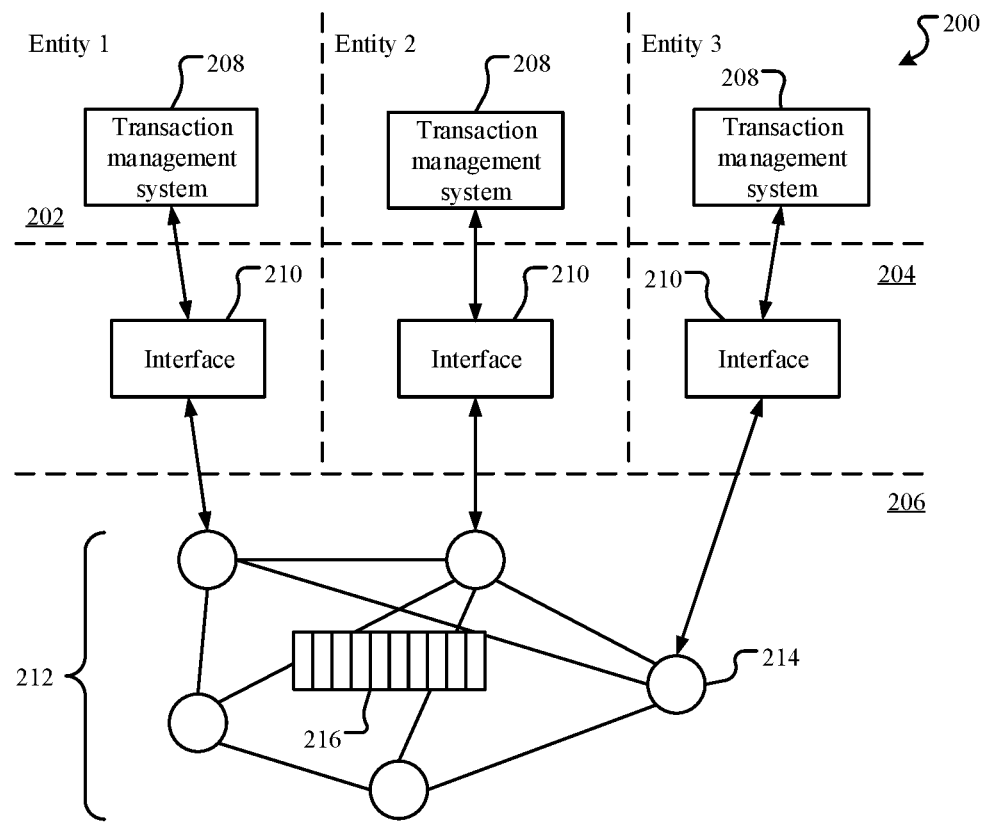
FIG. 2 is a schematic diagram illustrating a concept framework, according to an example implementation.

FIG. 2 is a schematic diagram illustrating a concept framework, according to an example implementation. As shown in FIG. 2, the concept framework 200 includes an entity layer 202, a hosting service layer 204, and a blockchain network layer 206. For example, the entity layer 202 can include three entities: an entity 1, an entity 2, and an entity 3, and each entity has its own transaction management system 208.

In an implementation, the hosting service layer 204 can include an interface 210 corresponding to each transaction management system 208. For example, each transaction management system 208 communicates with the corresponding interface 210 over a network (e.g., the network 114 in FIG. 1) using a protocol (e.g., Hypertext Transfer Protocol Secure (HTTPS)). In some examples, each interface 210 can provide a communication connection between a transaction management system 208 corresponding to each interface and the blockchain network layer 206. More specifically, the interface 210 can communicate with a blockchain network 212 of the blockchain network layer 206. In some examples, communication between the interface 210 and the blockchain network layer 206 can be implemented through remote procedure calls (RPCs). In some examples, the interface 210 can provide an API interface to the transaction management system 208 for accessing the blockchain network 212.

As described here, the blockchain network 212 is provided in the form of an equalized network including a plurality of nodes 214. Each of the nodes 214 is configured to permanently store a blockchain ledger 216 formed from blockchain data. FIG. 2 shows only one blockchain ledger 216, but a plurality of blockchain ledgers 216 or copies thereof can exist in the blockchain network 212. For example, each node 214 can maintain one blockchain ledger 216 or a copy thereof.

It is worthwhile to note that a transaction described in the present specification refers to data that is created by a user by using a client of a blockchain network and needs to be finally published to a distributed database of the blockchain. Transactions in the blockchain include a transaction in a narrow sense and a transaction in a broad sense. The transaction in the narrow sense refers to a value transfer published by a user in the blockchain. For example, in a conventional bitcoin blockchain network, the transaction can be a transfer initiated by the user in the blockchain. The transaction in the broad sense refers to service data with a service intention that is published by a user in the blockchain. For example, an operator can create a consortium blockchain based on an actual service need, and deploy some other types of online services (e.g., a rental service, a vehicle scheduling service, an insurance claim service, a credit service, and a medical service) that are not related to a value transfer in the consortium blockchain. In such a consortium blockchain, the transaction can be a service message or a service request with a service intention that is published by a user in the consortium blockchain.

Generally, there are three types of blockchains: a public blockchain, a private blockchain, and a consortium blockchain. In addition, there is a combination of a plurality of types, for example, a private blockchain+a consortium blockchain, or a consortium blockchain+a public blockchain. The public blockchain has the highest degree of decentralization. A bitcoin blockchain and an Ethereum blockchain are representatives of the public blockchain. Participants of the public blockchain can read data records in the blockchain, participate in transactions, compete for accounting rights of new blocks, etc. Furthermore, each participant (i.e., node) can freely join and exit the network and perform related operations. On the contrary, writing permission of the private blockchain network is controlled by a certain organization or agency, and data reading permission is specified by the organization. Briefly, the private blockchain network can be a weakly centralized system, a strict restriction is imposed on participating nodes, and there are a few participating nodes. This type of blockchain is more suitable for use within a specified organization. The consortium blockchain is a blockchain between the public blockchain and the private blockchain, and can implement "partial decentralization". Each node in the consortium blockchain network usually has a corresponding organization. Participants join the network through authorization and form an interest-related consortium to jointly maintain operations of the blockchain network.

Regardless of whether a blockchain network is a public blockchain network, a private blockchain network, or a consortium blockchain network, the present specification can implement collaboration between the blockchain network and an offchain private computing platform, so as to implement secure end-to-end data authorization between a data owner and a data user. The following describes the technical solutions of the present specification with reference to implementations.

Figure 3:
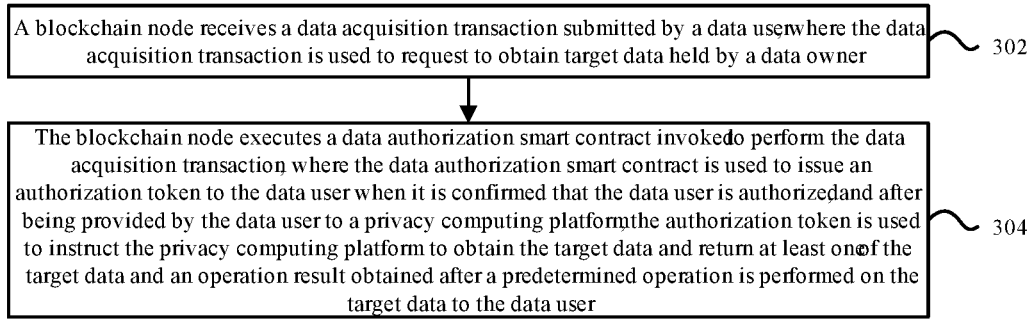
FIG. 3 is a flowchart illustrating a blockchain-based data authorization method, according to an example implementation.

FIG. 3 is a flowchart illustrating a blockchain-based data authorization method, according to an example implementation. As shown in FIG. 3, the method is applied to a blockchain node and can include the following steps.

Step 302: A blockchain node receives a data acquisition transaction submitted by a data user, where the data acquisition transaction is used to request to obtain target data held by a data owner.

The data user can directly generate the data acquisition transaction on the blockchain node. Or, the data user can generate the data acquisition transaction on a client, and send the data acquisition transaction to the blockchain node by using the client. Or, after generating the data acquisition transaction on a client, the data user can send the data acquisition transaction to another blockchain node, and the another blockchain node sends the data acquisition transaction to the blockchain node. Certainly, after a consensus on the data acquisition transaction is reached, the data acquisition transaction is transmitted to each blockchain node in the blockchain network, and each blockchain node executes the data acquisition transaction.

Generally, in a blockchain network using a consensus algorithm such as proof of work (POW), proof of stake (POS), and delegated proof of stake (DPOS), nodes that compete for accounting rights can execute a blockchain transaction after receiving the blockchain transaction. One of the nodes that compete for the accounting rights may win in the current round, and becomes an accounting node. Using the previous data acquisition transaction as an example, the accounting node can pack the data acquisition transaction with other transactions to generate a new block, and send the new block generated to other nodes for consensus.

In a blockchain network using mechanisms such as practical Byzantine fault tolerance (PBFT), a node with accounting rights can be predetermined before the current round of accounting. Therefore, after receiving the data acquisition transaction, the blockchain node can send the data acquisition transaction to the accounting node if the blockchain node itself is not the accounting node of the current round. The accounting node of the current round (which can be the previous blockchain node) can execute the data acquisition transaction when or before packing the data acquisition transaction to generate a new block or when or before packing the data acquisition transaction with other transactions to generate a new block. The accounting node packs the data acquisition transaction (or packs the data acquisition transaction with other transactions) to generate a new block, and then sends the new block generated or a block header to other nodes for consensus.

As described above, in the blockchain network using the POW mechanism or in the blockchain network using POS, DPOS, and PBFT mechanisms, the accounting node of the current round can pack the data acquisition transaction to generate a new block, and send the new block generated or a block header to other nodes for consensus. If the other nodes verify that there is no problem after receiving the block, the new block can be appended to the end of an original blockchain, so that the accounting process is completed and a consensus is reached. If the data acquisition transaction is used to invoke a data authorization smart contract, invocation and execution of the data authorization smart contract are completed. When performing verification on a new block or a block header sent by the accounting node, another node can also execute a data acquisition transaction in the block.

Step 304: The blockchain node executes a data authorization smart contract invoked to perform the data acquisition transaction, where the data authorization smart contract is used to issue an authorization token to the data user when it is confirmed that the data user is authorized, and after being provided by the data user to a privacy computing platform, the authorization token is used to instruct the privacy computing platform to obtain the target data and return at least one of the target data and an operation result obtained after a predetermined operation is performed on the target data to the data user.

The public blockchain network, the private blockchain network, and the consortium blockchain network can provide a function of a smart contract. A smart contract in a blockchain network is a contract that can be triggered by a transaction in the blockchain system. The smart contract can be defined in a form of code. Taking Ethereum as an example, a user can create and invoke some complex logic in the Ethereum network, which is the biggest challenge of Ethereum different from the bitcoin blockchain technology. As a programmable blockchain, the core of Ethereum is an Ethereum virtual machine (EVM), and each Ethereum node can run the EVM. The EVM is a Turing-complete virtual machine, through which various types of complex logic can be implemented. The smart contract published or invoked by a user in Ethereum can be run by the EVM.

After the data authorization smart contract is created, a corresponding contract account is formed in the blockchain, and the contract account has a specified contract address. For example, the data acquisition transaction can include the contract address in a TO field of the data acquisition transaction to invoke the data authorization smart contract. As described above, after blockchain nodes in the blockchain network reach a consensus, each node receives the data acquisition transaction, reads the TO field of the data acquisition transaction, and invokes the data authorization smart contract, which specifically means reading code of the data authorization smart contract into an EVM of the blockchain node for execution.

The data authorization smart contract can include a corresponding list of authorized parties for recording information about authorized objects of data held by the data owner, namely, information about the authorized parties. In this case, if the data authorization smart contract confirms that the data user is in the list of authorized parties, it can be confirmed that the data user is authorized. In a management method of the list of authorized parties, one-time authorization can be performed on all data held by the data owner, and content of the list of authorized parties is not affected even when the data held by the data owner increases or decreases, in other words, an update to the data held by the data owner can be compatible.

When the data authorization smart contract is being created, information about the list of authorized parties can be written into contract code, so that content of the list of authorized parties cannot be changed. In this case, the data authorization smart contract may need to be replaced or a version thereof may need to be updated, to update the list of authorized parties. Or, the data authorization smart contract can have one or more corresponding states, and the blockchain node can maintain values of the one or more states. When a state value is information about an authorized party, the one or more states are equivalent to the list of authorized parties. The data owner can submit a blockchain transaction in the blockchain network, and the blockchain transaction can invoke an authorization interface defined in the data authorization smart contract, so that content of the list of authorized parties can be updated after the data authorization smart contract is executed, without a need to replace the data authorization smart contract or update a version thereof. Or, the data authorization smart contract can invoke another smart contract, and code or a state of the another smart contract can be used to record the list of authorized parties. If the list of authorized parties is immutably written into the code of the another smart contract, when the list of authorized parties needs to be updated, a new smart contract can be created, where code of the new smart contract includes an updated list of authorized parties, and then the data authorization smart contract invokes a contract address of the new smart contract (the invoked contract address can be used as a state of the data authorization smart contract, and a value of the state can change). If the list of authorized parties is written into the state corresponding to the another smart contract, as described above, only a value of the state needs to be updated, to update the list of authorized parties, without a need to update the contract address invoked by the data authorization smart contract. The contract address can be permanently written into code of the data authorization smart contract, or can be written into a state of the data authorization smart contract.

The data user can temporarily request authorization from the data owner. For example, the data user can submit an authorization request transaction to the blockchain network, and the authorization request transaction invokes a request interface defined in the data authorization smart contract. As such, after executing the authorization request transaction, the blockchain node can invoke the request interface defined in the data authorization smart contract, so that the data authorization smart contract writes an authorization request event into a transaction log. Then, through an event monitoring responding mechanism, the data owner can respond to the authorization request event written into the transaction log. For example, when it is determined that the data user can be authorized, the data owner can submit an authorization confirmation transaction to the blockchain network, and the authorization confirmation transaction invokes an authorization interface defined in the data authorization smart contract. As such, after executing the authorization confirmation transaction, the blockchain node can invoke the authorization interface defined in the data authorization smart contract, so that the data authorization smart contract marks the data user as authorized. In one situation where the data user is marked as authorized, the data user can be added to the list of authorized parties. A process of adding the data user to the list of authorized parties is described above, and details are omitted here for simplicity. Provided that the data user is in the list of authorized parties, the data user can request to obtain the data held by the data owner at any time, in other words, the data user is authorized in the long term. In the other situation, the data authorization smart contract only confirms that the data user is authorized for a current operation. Therefore, the data authorization smart contract can cancel an authorized state of the data user after the authorization token is issued, and the data user needs to request authorization from the data owner again next time to obtain the authorization token.

Although the list of authorized parties belongs to long-term authorization compared with the latter situation, the list of authorized parties doesn't necessarily mean permanent authorization. For example, the data owner can update the list of authorized parties to remove one or more authorized parties, so that the one or more authorized parties are unauthorized. For another example, each authorized party in the list of authorized parties can have a certain quantity of remaining authorization duration and/or the quantity of remaining authorizations. For example, the data authorization smart contract can decrease at least one of remaining authorization duration and the number of remaining authorizations corresponding to the data user after the authorization token is issued. When the remaining authorization duration or the number of remaining authorizations is reset to 0, a corresponding authorized party can be automatically removed from the list of authorized parties, which is equivalent to an "aging" mechanism implemented on an authorized party in the list of authorized parties.

The data user can include information about the target data in the authorization request transaction, and the information about the target data can be written into the authorization request event in the transaction log, so that the data owner learns an authorization range requested by the data user. If the authorization request transaction does not include any data information, authorization for all data held by the data owner is requested by the data user. Accordingly, the data owner can add the information about the target data to the authorization confirmation transaction to indicate that the data user is authorized for the target data. If the authorization confirmation transaction submitted by the data owner does not include any data information, the data owner authorizes the data user for all data. Therefore, in some situations, the information about the target data included in the data acquisition transaction of the data user can be inconsistent with an authorization range (i.e., data that the data user is authorized) obtained by the data user. In this case, the target data may not eventually be successfully obtained.

The data acquisition transaction can include description information about the target data, for example, a hash value or any other description information of the target data, provided that the information can relate to the target data. For example, the description information about the target data can be included in a DATA field of the data acquisition transaction. When the data acquisition transaction invokes the data authorization smart contract, content in the DATA field can be used as input information of the data authorization smart contract. Correspondingly, when generating the authorization token, the data authorization smart contract can include the description information of the target data in the authorization token, so that the authorization token is used to obtain only the target data corresponding to the description information instead of other data. Certainly, the data acquisition transaction may not include the description information of the target data, but include only information about the data owner, so that the corresponding authorization token generated can be used to obtain any data of the data owner. When subsequently providing the authorization token to the privacy computing platform, the data user notifies the privacy computing platform of the description information of the target data that the data user hopes to obtain.

The data user provides the authorization token to the privacy computing platform, so that the privacy computing platform only needs to identify the authorization token without focusing on an identity of the data user, so as to obtain the target data based on the authorization token.

The target data can be stored in the blockchain, for example, stored in a database maintained by the blockchain node. To avoid leakage of the target data, the target data usually needs to be encrypted before being stored. For example, the data owner can submit a certificate transaction to the blockchain network, where the certificate transaction includes encrypted target data, so that after receiving the certificate transaction, the blockchain node can store the encrypted target data included in the certificate transaction. The encrypted target data is obtained by encrypting the target data by using a public key of the data owner. Correspondingly, a private key of the data owner can be hosted on the privacy computing platform, so that the privacy computing platform can read the encrypted target data from the database maintained by the blockchain node, and decrypt the encrypted target data based on the hosted private key of the data owner to obtain the target data. For another example, the data owner can submit a privacy certificate transaction to the blockchain network, where transaction content of the privacy certificate transaction is encrypted (which can be implemented through symmetric encryption, asymmetric encryption, or digital envelope encryption), and the transaction content includes the target data, so that the blockchain node can obtain the transaction content of the privacy certificate transaction in a trusted execution environment (TEE) through decryption to obtain the target data, and encrypt the target data in the TEE by using a public key of the data owner to obtain encrypted target data, so as to store the encrypted target data in the database corresponding to the blockchain node. Correspondingly, a private key of the data owner can be hosted on the privacy computing platform, so that after obtaining the encrypted target data, the privacy computing platform can obtain the target data through decryption by using the private key. For another example, the target data can be generated by the blockchain node in a process of executing a blockchain transaction (e.g., a certificate transaction submitted by the data owner) in a TEE, and the blockchain node can encrypt the generated target data in the TEE by using a public key of the data owner to obtain encrypted target data, so as to be stored in the database corresponding to the blockchain node. Correspondingly, a private key of the data owner can be hosted on the privacy computing platform, so that after obtaining the encrypted target data, the privacy computing platform can obtain the target data through decryption by using the private key.

As described above, the target data can be encrypted in the TEE. Because the target data can be any data requested by the data user and held by the data owner, any data held by the data owner can be encrypted in a similar way. The TEE is a trusted execution environment based on a secure extension of CPU hardware that is isolated from the outside. The TEE was first proposed by the Global Platform to alleviate a problem of resource security isolation on a mobile device, and is parallel to a trusted and secure execution environment provided by an operating system to an application. For example, TEE technologies such as Intel's Software Protection Extensions (SGX) isolate code execution, remote attestation, secure configuration, secure storage of data, and trusted paths for executing code. Security of an application running in the TEE is protected, and the application is almost impossible to be accessed by a third party.

The Intel SGX technology is used as an example. The blockchain node can allocate an enclave page cache (EPC) in a memory by using a processor instruction added to a CPU, load an EVM into the EPC, and confirm, through remote attestation, that code of the loaded EVM is consistent with code of an EVM at a key management server (e.g., comparing hash values). After the remote attestation succeeds, the blockchain node encrypts the target data by using a memory encryption engine (MME) in the CPU, and stores encrypted target data into the EPC. The encrypted content in the EPC can be decrypted to a plaintext only after entering the CPU. The target data in plaintext is encrypted in the CPU to obtain the encrypted target data, so as to be stored in the database corresponding to the blockchain node. Similarly, the blockchain node can decrypt the encrypted target data in the TEE. In response to the data acquisition transaction submitted by the data user, the blockchain node can also execute the data authorization smart contract in the TEE to generate the authorization token in the TEE. Therefore, encryption and decryption are performed for the target data in the TEE, and the code of the data authorization smart contract is executed, so that a secure and reliable environment can be provided, and interference from external factors is reduced.

In addition to being stored in the database of the blockchain node, the target data can be stored through a channel off the blockchain by the data owner, and the blockchain node stores only a digital digest of the target data. For example, the digital digest can be a hash value of the target data. The privacy computing platform can obtain the target data from the channel off the blockchain, and provide at least one of the target data and the operation result to the data user.

After obtaining the target data, the privacy computing platform can directly provide the target data to the data user. Or, after obtaining the target data, the privacy computing platform can perform the predetermined operation on the target data, and provide the operation result the data user. The predetermined operation can be any operation desired by the data user, and is not limited in the present specification. For example, an operation rule of the predetermined operation can be predefined in the data authorization smart contract. One or more operation rules can be defined in the data authorization smart contract. Especially, when there are a plurality of operation rules, the data user can specify a needed operation rule in the data acquisition transaction (e.g., the data user adds an identifier corresponding to the operation rule to the DATA field of the data acquisition transaction). The data authorization smart contract can add the needed operation rule to the authorization token. For another example, an operation rule of the predetermined operation can be transferred into the data authorization smart contract by the data acquisition transaction. For example, the operation rule of the predetermined operation can be written into the DATA field of the data acquisition transaction, and then transferred into the data authorization smart contract. The data authorization smart contract can add the needed operation rule to the authorization token. For another example, an operation rule of the predetermined operation can be provided by the data user to the privacy computing platform together with the authorization token. In summary, the privacy computing platform can learn the operation rule of the predetermined operation, and perform the predetermined operation on the target data based on the operation rule, so as to obtain the corresponding operation result and provide the corresponding operation result to the data user. When the corresponding operation result is obtained after the predetermined operation is performed on the target data, if the data user cannot inversely deduce a value of the target data from the operation result, the data user can be prevented from directly obtaining the target data while a data acquisition requirement of the data user is satisfied. As such, the data user can be prevented from leaking the target data and jeopardizing interests of the data owner, ensuring that the target data is always held only by the data owner.

Data held by the data owner can have different privacy levels. Correspondingly, data at different privacy levels can be processed in different ways. For example, the data owner can separately hold data at a relatively low privacy level and data at a relatively high privacy level. Correspondingly, when the target data is at the low privacy level, the target data can be provided to the data user, in other words, the data owner does not care whether the data at the low privacy level is leaked. When the target data is at the high privacy level, a predetermined operation needs to be performed on the target data, so that a corresponding operation result is provided to the data user, ensuring that the data at the high privacy level is not leaked. If the target data includes both data at the low privacy level and data at the high privacy level, the target data at the low privacy level can be directly provided to the data user, the predetermined operation is performed on the target data at the high privacy level, and the operation result is then provided to the data user. Or, the predetermined operation can be implemented on all target data, and then the operation result is provided to the data user.

To protect at least one of the target data and the operation result, the privacy computing platform can transmit at least one of the target data and the operation result through a data channel (e.g., an encrypted data channel) established between the privacy computing platform and the data user. Or, the privacy computing platform can perform encrypted transmission on at least one of the target data and the operation result. When performing encrypted transmission, the privacy computing platform can encrypt at least one of the target data and the operation result by using a public key of the data user, and transmit at least one of encrypted target data and an encrypted operation result to the data user, and the data user can decrypt at least one of the encrypted target data and the encrypted operation result by using a private key of the data user to obtain at least one of the target data and the operation result in plaintext. Or, the authorization token can include a temporary session key, and at least one of the target data and the operation result can be encrypted by using the temporary session key, and then is provided by the privacy computing platform to the data user. The authorization token can include a first field and a second field. Content of the first field is obtained by encrypting the temporary session key by using a first key corresponding to the data user (e.g., the public key of the data user), and content of the second field is obtained by encrypting the temporary session key by using a second key corresponding to the privacy computing platform (e.g., a public key of the privacy computing platform), so that the data user and the privacy computing platform can separately decrypt the authorization token to obtain the temporary session key, and perform encrypted transmission on at least one of the target data and the operation result based on a symmetric encryption scheme.

Figure 4:
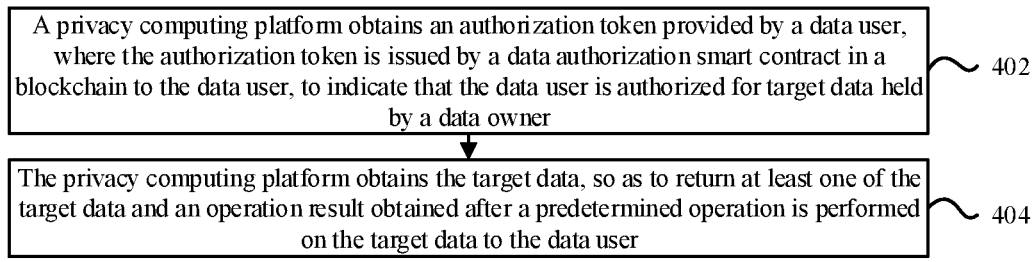
FIG. 4 is a flowchart illustrating another blockchain-based data authorization method, according to an example implementation.

Correspondingly, FIG. 4 is a flowchart illustrating another blockchain-based data authorization method, according to an example implementation. As shown in FIG. 4, the method is applied to a privacy computing platform and can include the following steps.

Step 402: A privacy computing platform obtains an authorization token provided by a data user, where the authorization token is issued by a data authorization smart contract in a blockchain to the data user, to indicate that the data user is authorized for target data held by a data owner.

As described above, the data user can invoke the data authorization smart contract by submitting a data acquisition transaction to the blockchain network, so that the data authorization smart contract can issue the authorization token to the data user when it is confirmed that the data user is authorized. In other words, identity identification or permission verification can be performed on the data user by using the data authorization smart contract in the blockchain network, and the privacy computing platform only needs to identify the authorization token without focusing on an identity or permission of the data user. For the process that the data authorization smart contract determines whether the data user is authorized, references can be made to the implementation shown in FIG. 3. Details are omitted here for simplicity.

Step 404: The privacy computing platform obtains the target data, so as to return at least one of the target data and an operation result obtained after a predetermined operation is performed on the target data to the data user.

The target data can be stored in the blockchain, for example, stored in a database maintained by a blockchain node. To avoid leakage of the target data, the target data usually needs to be encrypted before being stored. For example, the data owner can submit a certificate transaction to the blockchain network, where the certificate transaction includes encrypted target data, so that after receiving the certificate transaction, the blockchain node can store the encrypted target data included in the certificate transaction. The encrypted target data is obtained by encrypting the target data by using a public key of the data owner. Correspondingly, a private key of the data owner can be hosted on the privacy computing platform, so that the privacy computing platform can read the encrypted target data from the database maintained by the blockchain node, and decrypt the encrypted target data based on the hosted private key of the data owner to obtain the target data. For another example, the data owner can submit a privacy certificate transaction to the blockchain network, where transaction content of the privacy certificate transaction is encrypted, and the transaction content includes the target data, so that the blockchain node can obtain the transaction content of the privacy certificate transaction in a trusted execution environment (TEE) through decryption to obtain the target data, and encrypt the target data in the TEE by using a public key of the data owner to obtain encrypted target data, so as to store the encrypted target data in the database corresponding to the blockchain node. Correspondingly, a private key of the data owner can be hosted on the privacy computing platform, so that after obtaining the encrypted target data, the privacy computing platform can obtain the target data through decryption by using the private key. For another example, the target data can be generated by the blockchain node in a process of executing a blockchain transaction (e.g., a certificate transaction submitted by the data owner) in a TEE, and the blockchain node can encrypt the generated target data in the TEE by using a public key of the data owner to obtain encrypted target data, so as to be stored in the database corresponding to the blockchain node. Correspondingly, a private key of the data owner can be hosted on the privacy computing platform, so that after obtaining the encrypted target data, the privacy computing platform can obtain the target data through decryption by using the private key.

In addition to being stored in the database of the blockchain node, the target data can be stored through a channel off the blockchain by the data owner, and the blockchain node stores only a digital digest of the target data. For example, the digital digest can be a hash value of the target data. The privacy computing platform can obtain the target data from the channel off the blockchain based on the authorization token, and provide at least one of the target data and the operation result to the data user.

After obtaining the target data, the privacy computing platform can directly provide the target data to the data user. Or, after obtaining the target data, the privacy computing platform can perform the predetermined operation on the target data, and provide the operation result the data user. The predetermined operation can be any operation desired by the data user, and is not limited in the present specification. For example, an operation rule of the predetermined operation can be predefined in the data authorization smart contract. One or more operation rules can be defined in the data authorization smart contract. Especially, when there are a plurality of operation rules, the data user can specify a needed operation rule in the data acquisition transaction (e.g., the data user adds an identifier corresponding to the operation rule to the DATA field of the data acquisition transaction). The data authorization smart contract can add the needed operation rule to the authorization token. For another example, an operation rule of the predetermined operation can be transferred into the data authorization smart contract by the data acquisition transaction. For example, the operation rule of the predetermined operation can be written into the DATA field of the data acquisition transaction, and then transferred into the data authorization smart contract. The data authorization smart contract can add the needed operation rule to the authorization token. For another example, an operation rule of the predetermined operation can be provided by the data user to the privacy computing platform together with the authorization token. In summary, the privacy computing platform can learn the operation rule of the predetermined operation, and perform the predetermined operation on the target data based on the operation rule, so as to obtain the corresponding operation result and provide the corresponding operation result to the data user. When the corresponding operation result is obtained after the predetermined operation is performed on the target data, if the data user cannot inversely deduce a value of the target data from the operation result, the data user can be prevented from directly obtaining the target data while a data acquisition requirement of the data user is satisfied. As such, the data user can be prevented from leaking the target data and jeopardizing interests of the data owner, ensuring that the target data is always held only by the data owner.

Data held by the data owner can have different privacy levels. Correspondingly, data at different privacy levels can be processed in different ways. For example, the data owner can separately hold data at a relatively low privacy level and data at a relatively high privacy level. Correspondingly, when the target data is at the low privacy level, the target data can be provided to the data user, in other words, the data owner does not care whether the data at the low privacy level is leaked. When the target data is at the high privacy level, a predetermined operation needs to be performed on the target data, so that a corresponding operation result is provided to the data user, ensuring that the data at the high privacy level is not leaked. If the target data includes both data at the low privacy level and data at the high privacy level, the target data at the low privacy level can be directly provided to the data user, the predetermined operation is performed on the target data at the high privacy level, and the operation result is then provided to the data user. Or, the predetermined operation can be implemented on all target data, and then the operation result is provided to the data user.

To protect at least one of the target data and the operation result, the privacy computing platform can transmit at least one of the target data and the operation result through a data channel (e.g., an encrypted data channel) established between the privacy computing platform and the data user. Or, the privacy computing platform can perform encrypted transmission on at least one of the target data and the operation result. When performing encrypted transmission, the privacy computing platform can encrypt at least one of the target data and the operation result by using a public key of the data user, and transmit at least one of encrypted target data and an encrypted operation result to the data user, and the data user can decrypt at least one of the encrypted target data and the encrypted operation result by using a private key of the data user to obtain at least one of the target data and the operation result in plaintext. Or, the authorization token can include a temporary session key, and at least one of the target data and the operation result can be encrypted by using the temporary session key, and then is provided by the privacy computing platform to the data user. The authorization token can include a first field and a second field. Content of the first field is obtained by encrypting the temporary session key by using a first key corresponding to the data user (e.g., the public key of the data user), and content of the second field is obtained by encrypting the temporary session key by using a second key corresponding to the privacy computing platform (e.g., a public key of the privacy computing platform), so that the data user and the privacy computing platform can separately decrypt the authorization token to obtain the temporary session key, and perform encrypted transmission on at least one of the target data and the operation result based on a symmetric encryption scheme.

It is worthwhile to note that "data" held by the data owner and requested by the data user in the present specification should be understood as a generalized concept, for example, a value, a character, an image, audio, a video, code, a program, or a model (e.g., an artificial intelligence model). Implementations are not limited in the present specification.

Figure 5:
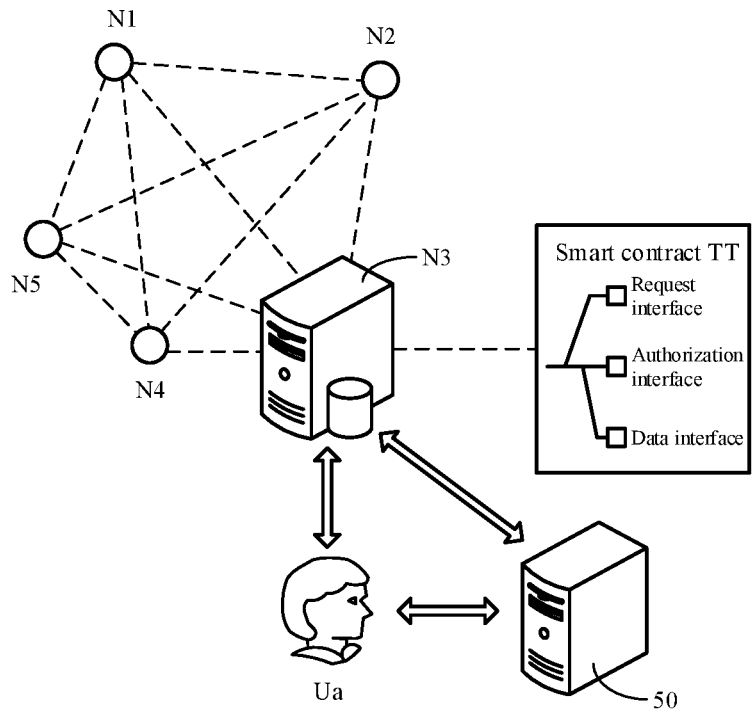
FIG. 5 is a schematic diagram illustrating end-to-end data authorization implemented based on a blockchain network, according to an example implementation.

FIG. 5 is a schematic diagram illustrating end-to-end data authorization implemented based on a blockchain network, according to an example implementation. As shown in FIG. 5, assume that nodes such as N1, N2, N3, N4, and N5 exist in a blockchain network, and the blockchain network can be a consortium blockchain network composed of a service platform and several partners. For example, in a supply chain financial scenario, nodes such as N1, N2, N4, and N5 correspond to several supply chain financial enterprises directly or indirectly, node N3 corresponds to the service platform, and a user can obtain, based on the service platform, target data of each supply chain financial enterprise or an operation result obtained based on the target data. For another example, in an invoice scenario, nodes such as N1, N2, N4, and N5 correspond to several merchants directly or indirectly, node N3 corresponds to the service platform, and a user can obtain, based on the service platform, invoices issued by the merchants, some information in the invoices, or an operation result obtained based on the invoice information. Certainly, the technical solutions of the present specification can be further applied to another scenario. Implementations are not limited in the present specification. For ease of understanding, the following uses the invoice scenario as an example for description.

Figures 6, 7:
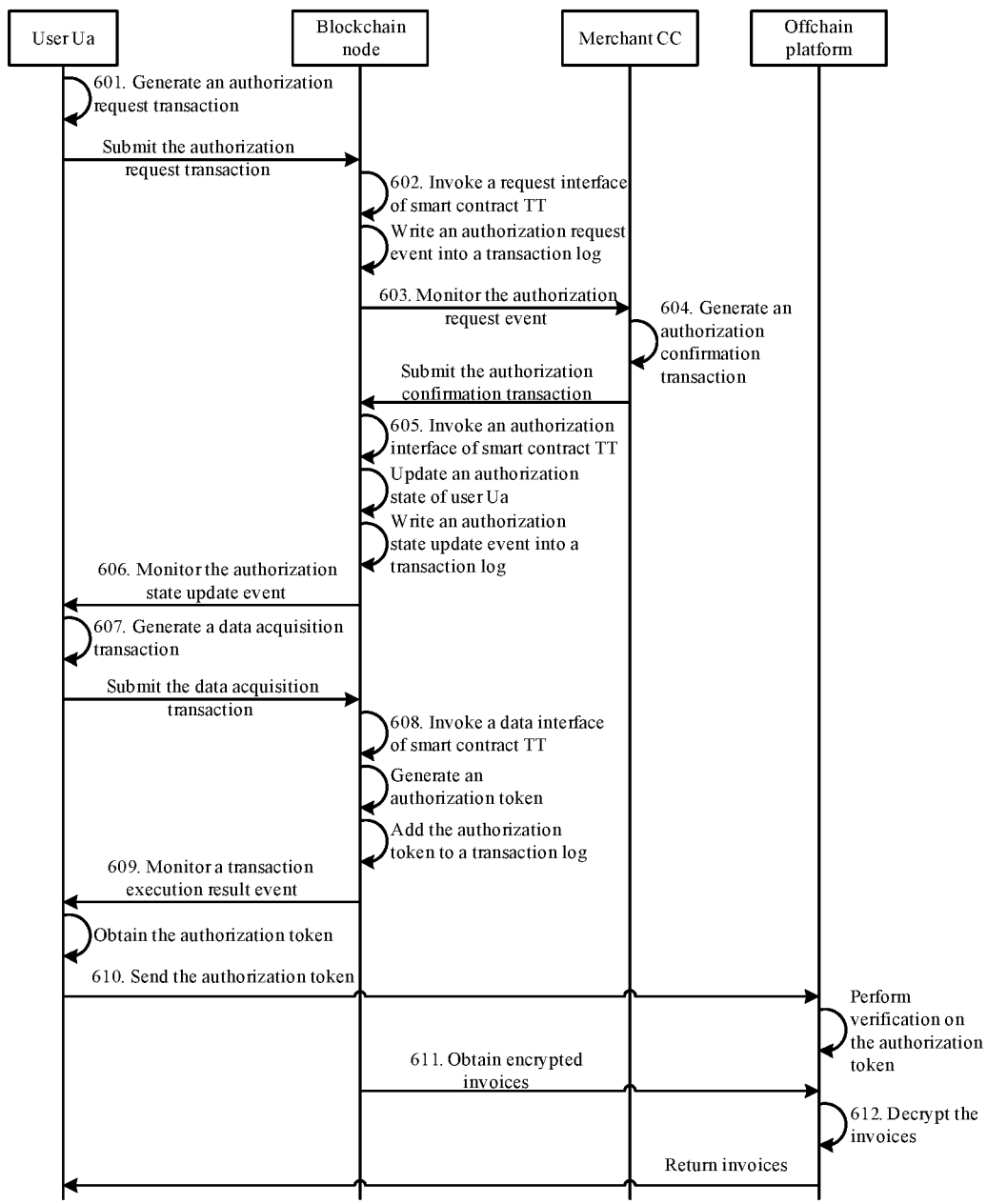
FIG. 6 is an interaction flowchart illustrating end-to-end data authorization implemented based on a blockchain network, according to an example implementation.
FIG. 7 is a schematic diagram illustrating an authorization token, according to an example implementation.

Assume that user Ua (which can be an individual or an organization) hopes to obtain invoices issued by merchant CC within the last month. According to the technical solutions of the present specification, user Ua can obtain these invoices conveniently, and security of these invoices can be ensured. For example, FIG. 6 is an interaction flowchart illustrating end-to-end data authorization implemented based on a blockchain network, according to an example implementation. As shown in FIG. 6, an interaction procedure between user Ua, a blockchain node, merchant CC, and an offchain platform can include the following steps.

Step 601: User Ua generates an authorization request transaction and submits the authorization request transaction to a blockchain network.

A computing device used by user Ua can run a client, generate the authorization request transaction based on the client, and submit the authorization request transaction to the blockchain network. Or, after generating the authorization request transaction on a client, user Ua can upload the authorization request transaction to a certain service platform, and the service platform submits the authorization request transaction to the blockchain network. Or, user Ua can initiate an authorization request to the service platform, so that the service platform generates the authorization request transaction and submits the authorization request transaction to the blockchain network.

A purpose of submitting the authorization request transaction to the blockchain network is to request merchant CC to grant a related right to user Ua, so that user Ua can finally obtain the previously described invoices issued within the last month. The authorization request transaction can include data description information describing data that user Ua hopes to request authorization from merchant CC. For example, the data description information can be used to describe the invoices issued by merchant CC within the last month. Accordingly, user Ua can be authorized for the invoices issued by merchant CC within the last month, but is unauthorized for other data. Or, the authorization request transaction may not include data description information, to indicate that user Ua hopes to request to obtain authorization for all data from merchant CC, so that user Ua is authorized for all data held by merchant CC, including the previously described invoices issued within the last month. The following describes subsequent steps by using an example that the authorization request transaction includes the data description information.

The authorization request transaction is initially submitted to a certain node in the blockchain network, for example, node N3 shown in FIG. 5 or another node. After the authorization request transaction is submitted to the blockchain network, a consensus can be made between nodes, and an agreed authorization request transaction can be executed on each node. POW, POS, DPOS, PBFT, or another consensus mechanism in a related technology can be used in the consensus process. Implementations are not limited in the present specification.

Step 602: The blockchain node assists, by invoking a request interface of smart contract TT, user Ua in obtaining data authorization, and writes an authorization request event into a transaction log.

After the consensus, each node in the blockchain network needs to execute the authorization request transaction. When executing the authorization request transaction, the blockchain node reads an account address filled in a TO field of the authorization request transaction, to invoke smart contract TT. Code of smart contract TT can logically generate a plurality of interfaces to implement different functions, and the authorization request transaction can specifically specify an interface that needs to be invoked. For example, when the authorization request transaction invokes the request interface of smart contract TT, related authorization can be requested.

For example, the authorization request transaction can include the previously described data description information, information about user Ua (e.g., a signature of user Ua), information about merchant CC (e.g., a public key of merchant CC), etc., so that after the request interface of smart contract TT is invoked, the authorization request event can be written into the transaction log of the authorization request transaction. Content of the authorization request event can include the data description information, the information about user Ua, the information about merchant CC, etc., to indicate that user Ua hopes to obtain target data corresponding to the data description information from merchant CC.

Step 603: Merchant CC monitors the authorization request event.

Because operations of blockchain nodes are consistent, merchant CC can access any corresponding blockchain node to learn the authorization request event based on an event monitoring mechanism, so as to determine the target data that user Ua hopes to obtain from merchant CC.

Step 604: Merchant CC generates an authorization confirmation transaction and submits the authorization confirmation transaction to the blockchain network.

When allowing user Ua to obtain related target data, merchant CC can generate and submit the authorization confirmation transaction, to indicate that merchant CC agrees to provide the target data such as the invoices issued within the last month to user Ua. Merchant CC is used as an example: The authorization confirmation transaction generated by merchant CC can include data description information corresponding to target data that merchant CC agrees to provide to user Ua, a public key of user Ua, a signature of merchant CC, etc. Or, the authorization confirmation transaction can include information such as a transaction number of the authorization request transaction, to indicate that merchant CC agrees a related request of the authorization request transaction.

Step 605: The blockchain node invokes an authorization interface of smart contract TT, updates an authorization state of user Ua, and writes an authorization state update event into a transaction log.

As described above, smart contract TT includes several predefined interfaces. In the authorization confirmation transaction submitted by merchant CC, a TO field can include a contract address of smart contract TT, and can specify a wish to invoke the authorization interface. Smart contract TT can confirm, by running code corresponding to the authorization interface, that merchant CC agrees to grant a right to user Ua for the target data such as the invoices issued within the last month, so as to update the authorization state of user Ua to "authorized". As described above, the authorized state of user Ua can be recorded in a plurality of forms, which depends on a rule defined in smart contract TT. Details are omitted here for simplicity.

For the update of the authorization state of user Ua, smart contract TT can write the corresponding authorization state update event into the transaction log to indicate that user Ua has obtained authorization for the invoices issued by merchant CC within the last month.

Step 606: User Ua monitors the authorization state update event.

Similar to step 603, user Ua can monitor, based on the event monitoring mechanism, the transaction log in the blockchain node that corresponds to the authorization confirmation transaction, and determine, based on the detected authorization state update event, that user Ua has obtained authorization for the invoices issued by merchant CC within the last month.

Step 607: User Ua generates a data acquisition transaction and submits the data acquisition transaction to the blockchain network.

Similar to the authorization request transaction, user Ua can generate and submit the data acquisition transaction in a plurality of ways. For example, user Ua independently generates and submits the data acquisition transaction, user Ua independently generates the data acquisition transaction and then the service platform submits the data acquisition transaction, or the service platform generates and submits the data acquisition transaction. Details are omitted here for simplicity.

The data acquisition transaction can include data description information describing that user Ua hopes to obtain the invoices issued by merchant CC within the last month. Or, the data acquisition transaction can include the transaction number of the authorization request transaction or a transaction number of the authorization confirmation transaction, and can also indirectly indicate that user Ua hopes to obtain the invoices issued by merchant CC within the last month.

Step 608: The blockchain node invokes a data interface of smart contract TT, generates an authorization token, and adds the authorization token to a transaction log.

The data interface of smart contract TT is invoked to indicate, to smart contract TT, that user Ua hopes to obtain the invoices issued by merchant CC within the last month. Smart contract TT can search for the authorization state of user Ua.

If user Ua is unauthorized, the transaction can be terminated. Or, smart contract TT can write the authorization request event into the transaction log, to temporarily request authorization from merchant CC through a process similar to steps 602 to 605. In this case, the data acquisition transaction is equivalent to an authorization request function and a data acquisition function, and a related operation and step of the authorization request transaction can be omitted.

If user Ua has been authorized, smart contract TT can generate the authorization token for user Ua, so that user Ua can obtain the invoices issued by merchant CC within the last month based on the authorization token. FIG. 7 is a schematic diagram illustrating an authorization token, according to an example implementation. As shown in FIG. 7, the authorization token can include user ID, $ENC(K_{Ua}, K_{TEMP})$, $ENC(K_M, K_{TEMP})$, authorization content, and TAG, etc. Certainly, content of the authorization token can vary with a scenario appropriately. Implementations are not limited in the present specification.

The user ID field can include an ID of user Ua. When user Ua subsequently provides the authorization token to the offchain platform, the offchain platform can compare information about a provider with the user ID included in the authorization token, and use a comparison result of consistency as one of conditions for verifying the authorization token. In other words, if the authorization token is obtained by user Ub, when user Ub provides the authorization token to the offchain platform, because the user ID included in the authorization token belongs to user Ua and does not belong to user Ub, the offchain platform can determine that the authorization token is unverified, in other words, the authorization token is invalid. If user Ua provides the authorization token to the offchain platform, because the user ID field of the authorization token includes the ID of user Ua, it can be determined that the provider of the authorization token is consistent with the authorization token, and the authorization token is valid.

ENC($K_{Ua}$, $K_{TEMP}$) represents an encryption result obtained by encrypting $K_{Ua}$ and $K_{TEMP}$ by using a predetermined algorithm. $K_{Ua}$ is a key corresponding to user Ua, $K_{TEMP}$ is a temporary key generated by smart contract TT for current data authorization, and $K_{Ua}$ is controlled by user Ua, so that user Ua can decrypt ENC($K_{Ua}$, $K_{TEMP}$) based on the key $K_{Ua}$, to obtain the temporary key $K_{TEMP}$.

ENC($K_M$, $K_{TEMP}$) represents an encryption result obtained by encrypting $K_M$ and $K_{TEMP}$ by using a predetermined algorithm. $K_M$ is a key corresponding to the offchain platform, $K_{TEMP}$ is a temporary key generated by smart contract TT for current data authorization, and $K_M$ is controlled by the offchain platform, so that the offchain platform can decrypt ENC($K_M$, $K_{TEMP}$) based on the key $K_M$, to obtain the temporary key $K_{TEMP}$.

The authorization content can include the previously described data description information describing data that user Ua is authorized. For example, in the implementation shown in FIG. 6, the authorization content can be the invoices issued by merchant CC within the last month.

The TAG field is used to perform verification on content integrity and authenticity of the authorization token. Assume that content of fields such as user ID, ENC($K_{Ua}$, $K_{TEMP}$), ENC($K_M$, $K_{TEMP}$), and authorization content are collectively referred to as MG. In addition to the TAG field, content of the TAG field can include MAC=C($K_M$, MG), that is, a message authentication code (MAC) generated based on a key and the content MG, where C( ) represents a generation function used. After receiving the authorization token, the offchain platform can perform verification on other fields included in the authorization token based on the key $K_M$ controlled by the offchain platform and MAC included in the TAG field, so as to determine whether the content MG is tampered with or whether data is lost or damaged during transmission, etc.

Step 609: User Ua monitors a transaction execution result event.

As described above, user Ua can monitor the transaction log of the data acquisition transaction based on the event monitoring responding mechanism, to detect the transaction execution result event. If the data acquisition transaction is successfully implemented, user Ua can obtain the authorization token from the transaction execution result event.

Step 610: The offchain platform receives the authorization token sent by user Ua, and performs verification on the authorization token.

As described above, the offchain platform can perform verification on integrity of the authorization token based on the TAG field, perform verification on consistency between the user ID field and user Ua, etc. If all is verified, the offchain platform can decrypt the authorization token to obtain the temporary key $K_{TEMP}$.

Step 611: The offchain platform obtains encrypted invoices from the blockchain after the verification succeeds.

Step 612: After decrypting the encrypted invoices, the offchain platform returns the invoices to user Ua.

The encrypted invoices are stored in the blockchain network, so that the offchain platform can access any blockchain node in the blockchain network, and obtain the encrypted invoices. Actually, because all data stored in the blockchain network is open, the offchain platform can freely access data stored in the blockchain network. Even the offchain platform can locally synchronize data in the blockchain network, so that after obtaining the authorization token provided by user Ua, the offchain platform can directly obtain the encrypted invoices locally without temporarily accessing the blockchain network, thereby accelerating responding and shortening a wait time of user Ua.

The invoices can be encrypted by using the public key of merchant CC to obtain the encrypted invoices. The encrypted invoices can be decrypted only by using a private key of merchant CC, and the private key is not open. Therefore, even if the encrypted invoices are freely accessible, it can be ensured that the invoices of merchant CC are secure. To satisfy a requirement of an authorized user for obtaining an invoice, and reduce processing pressure of merchant CC, the offchain platform can provide a private key hosting service to merchant CC, so that merchant CC can securely host the private key on the offchain platform. In this case, the offchain platform can directly decrypt an encrypted invoice, and provide an invoice obtained through decryption to a data user such as user Ua.

After obtaining the invoices in plaintext through decryption, the offchain platform can encrypt the invoices by using the temporary key $K_{TEMP}$, and transmit the encrypted invoices to user Ua. Correspondingly, user Ua can decrypt the received transmission data by using the temporary key $K_{TEMP}$, to obtain the invoices issued by merchant CC within the last month. As such, secure data transmission between the offchain platform and user Ua is ensured.

Figure 8:
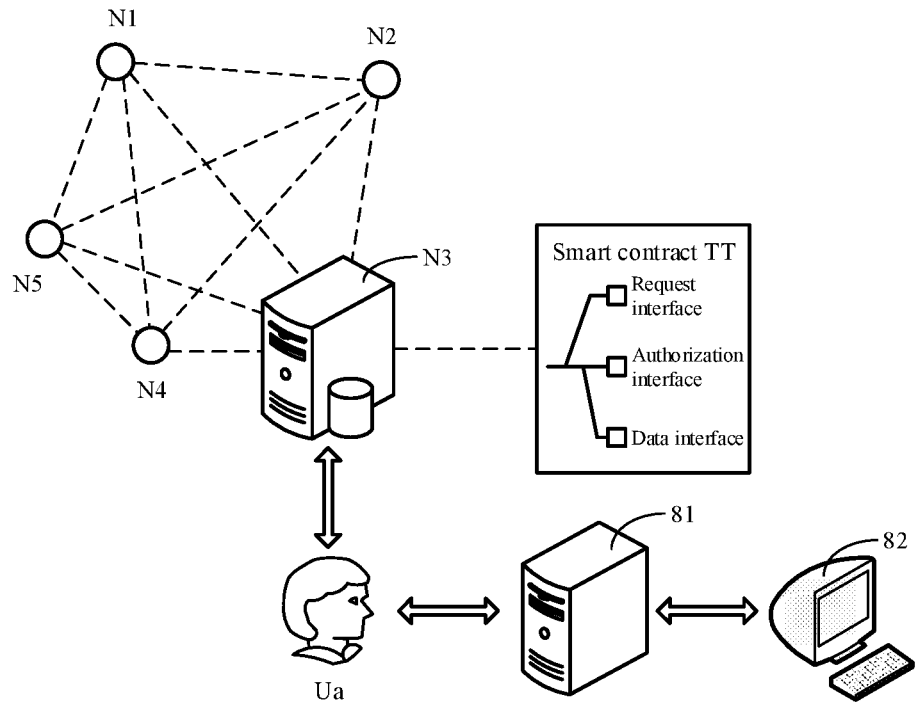
FIG. 8 is a schematic diagram illustrating another type of end-to-end data authorization implemented based on a blockchain network, according to an example implementation.

In the implementation shown in FIG. 5 and FIG. 6, data held by a data owner is encrypted by using a public key and stored in the blockchain network, for example, stored in a block (included in transaction content) or a local database maintained by a blockchain node, and a private key of the data owner is hosted on the offchain platform, so that the offchain platform can directly provide data needed by a data user to the data user. In other implementations, the data owner can store related data in offchain storage space instead of the blockchain network, so that the offchain platform needs to conduct a transaction with the offchain storage space to obtain corresponding target data. For example, FIG. 8 is a schematic diagram illustrating another type of end-to-end data authorization implemented based on a blockchain network, according to an example implementation. As shown in FIG. 8, a related structure of a blockchain network is similar to that in FIG. 5, and details are omitted here for simplicity. Assume that user Ua hopes to obtain an average invoicing amount of invoices issued by merchant CC within the last three months. There are two methods: (1) The invoices issued by merchant CC within the last three months are provided to user Ua, and user Ua calculates the average invoicing amount. (2) After the average invoicing amount of the invoices issued by merchant CC within the last three months is calculated, only the average invoicing amount is provided to user Ua.

Method (1) is similar to the implementation shown in FIG. 5 and FIG. 6, except that there are some differences in an interaction process in FIG. 8. As shown in FIG. 8, user Ua can obtain an authorization token through steps such as steps 601 to 609 in FIG. 6. An authorization content field of the authorization token describes the invoices issued by merchant CC within the last three months. User Ua provides the authorization token to an offchain platform 81. After determining that the authorization token is verified, the offchain platform 81 requests to obtain the invoices issued by merchant CC within the last three months from offchain storage space 82. The offchain storage space 82 can be maintained by merchant CC or an object other than merchant CC. Then, the offchain platform 81 encrypts the invoice data based on the previously described temporary key $K_{TEMP}$, and transmits encrypted invoice data to user Ua. After decrypting the encrypted invoice data by using the temporary key $K_{TEMP}$, user Ua can perform further calculation on the obtained invoice data to obtain the corresponding average invoicing amount.

Method (2) is quite different. As shown in FIG. 8, user Ua can obtain an authorization token through steps such as steps 601 to 609 in FIG. 6. An authorization content field of the authorization token describes the average invoicing amount of the invoices issued by merchant CC within the last three months, so that user Ua provides the authorization token to an offchain platform 81. After determining that the authorization token is verified, the offchain platform 81 can request to obtain the invoices issued by merchant CC within the last three months from offchain storage space 82, and the offchain platform 81 calculates the corresponding average invoicing amount based on the invoices. Then, the offchain platform 81 encrypts the average invoicing amount based on the previously described temporary key $K_{TEMP}$, and transmits an encrypted average invoicing amount to user Ua. After decrypting the encrypted average invoicing amount by using the temporary key $K_{TEMP}$, user Ua can obtain the average invoicing amount. Based on method (2), user Ua can obtain a value of the average invoicing amount, and an invoicing amount of each invoice is not exposed to user Ua, so that a requirement of user Ua can be satisfied, and leakage of invoice data of merchant CC can be alleviated. In particular, data held by merchant CC is secure and controllable after user Ua provides the invoices to other users after obtaining the invoices.

The processing method used in method (2) is also applicable to the implementation shown in FIG. 5 and FIG. 6. For example, an offchain platform 50 can obtain, from the blockchain network, encrypted data corresponding to the invoices issued by merchant CC within the last three months, and decrypt the encrypted data based on a hosted private key to obtain the invoices in plaintext. Then, the offchain platform 50 calculates the average invoicing amount of the invoices issued by merchant CC within the last three months, and provides the average invoicing amount to user Ua, preventing user Ua from directly learning the invoices issued by merchant CC within the last three months.

Figure 9:
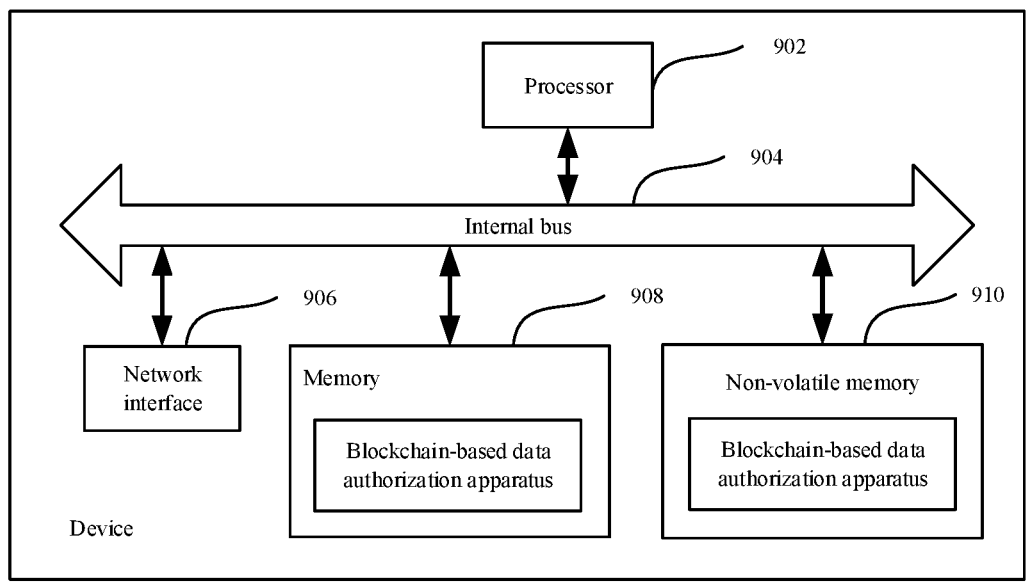
FIG. 9 is a schematic structural diagram illustrating a device, according to an example implementation.

FIG. 9 is a schematic structural diagram illustrating a device, according to an example implementation. As shown in FIG. 9, in terms of hardware, the device includes a processor 902, an internal bus 904, a network interface 906, a memory 908, and a non-volatile memory 910, and certainly can further include other hardware needed by services. The processor 902 reads a corresponding computer program from the non-volatile memory 910 into the memory 908 and then runs the corresponding computer program, so as to form a blockchain-based data authorization apparatus in terms of logic. Certainly, in addition to software implementation, one or more implementations of the present specification do not exclude other implementations, for example, a logical device or a combination of hardware and software. In other words, an execution body of the following processing procedure is not limited to each logical unit, and can also be hardware or a logical device.

Figure 10:
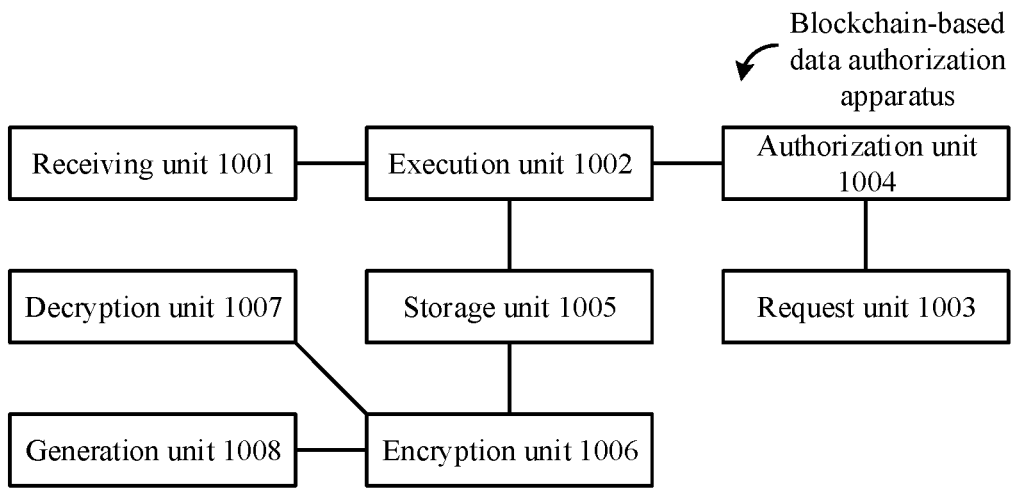
FIG. 10 is a block diagram illustrating a blockchain-based data authorization apparatus, according to an example implementation.

As shown in FIG. 10, in terms of software implementation, the blockchain-based data authorization apparatus can include the following: a receiving unit 1001, configured to enable a blockchain node to receive a data acquisition transaction submitted by a data user, where the data acquisition transaction is used to request to obtain target data held by a data owner; and an execution unit 1002, configured to enable the blockchain node to execute a data authorization smart contract invoked to perform the data acquisition transaction, where the data authorization smart contract is used to issue an authorization token to the data user when it is confirmed that the data user is authorized, and after being provided by the data user to a privacy computing platform, the authorization token is used to instruct the privacy computing platform to obtain the target data and return at least one of the target data and an operation result obtained after a predetermined operation is performed on the target data to the data user.

Optionally, the data authorization smart contract has a corresponding list of authorized parties, and it is confirmed that the data user is authorized when the data authorization smart contract confirms that the data user is in the list of authorized parties.

Optionally, the apparatus further includes the following: a request unit 1003, configured to enable the blockchain node to invoke a request interface defined in the data authorization smart contract based on an authorization request transaction submitted by the data user, so that the data authorization smart contract writes an authorization request event into a transaction log for monitoring by the data owner; and an authorization unit 1004, configured to enable the blockchain node to invoke an authorization interface defined in the data authorization smart contract based on an authorization confirmation transaction submitted by the data owner, so that the data authorization smart contract confirms that the data user is authorized.

Optionally, the data authorization smart contract is further used to cancel an authorized state of the data user after the authorization token is issued; or the data authorization smart contract is further used to decrease the number of remaining authorizations corresponding to the data user after the authorization token is issued.

Optionally, when the target data is at a low privacy level, the target data is provided to the data user; or when the target data is at a high privacy level, the predetermined operation is performed on the target data, so that the corresponding operation result is provided to the data user.

Optionally, the apparatus further includes the following: a storage unit 1005, configured to enable the blockchain node to store, after receiving a certificate transaction, encrypted target data included in the certificate transaction, where the encrypted target data is obtained by encrypting the target data by using a public key of the data owner, where a private key of the data owner is hosted on the privacy computing platform, so that the privacy computing platform decrypts the encrypted target data to obtain the target data after obtaining the encrypted target data.

Optionally, the apparatus further includes the following: an encryption unit 1006, configured to enable the blockchain node to encrypt the target data in a trusted execution environment by using a public key of the data owner to obtain encrypted target data, so that the encrypted target data is stored in a database corresponding to the blockchain node, where a private key of the data owner is hosted on the privacy computing platform, so that the privacy computing platform decrypts the encrypted target data to obtain the target data after obtaining the encrypted target data.

Optionally, the apparatus further includes the following: a decryption unit 1007, configured to enable the blockchain node to decrypt, after receiving a privacy certificate transaction submitted by the data owner, the privacy certificate transaction in the trusted execution environment to obtain the target data included in transaction content; or a generation unit 1008, configured to enable the blockchain node to execute, after receiving a certificate transaction submitted by the data owner, corresponding transaction content in the trusted execution environment to generate the target data.

Optionally, the blockchain node stores a digital digest of the target data, the target data is stored through a channel off the blockchain by the data owner, and the target data is obtained by the privacy computing platform from the channel off the blockchain.

Optionally, the authorization token includes a temporary session key, and at least one of the target data and the operation result is encrypted by using the temporary session key and then is transmitted by the privacy computing platform to the data user.

Optionally, the authorization token includes a first field and a second field, content of the first field is obtained by encrypting the temporary session key by using a first key corresponding to the data user, and content of the second field is obtained by encrypting the temporary session key by using a second key corresponding to the privacy computing platform.

Figure 11:
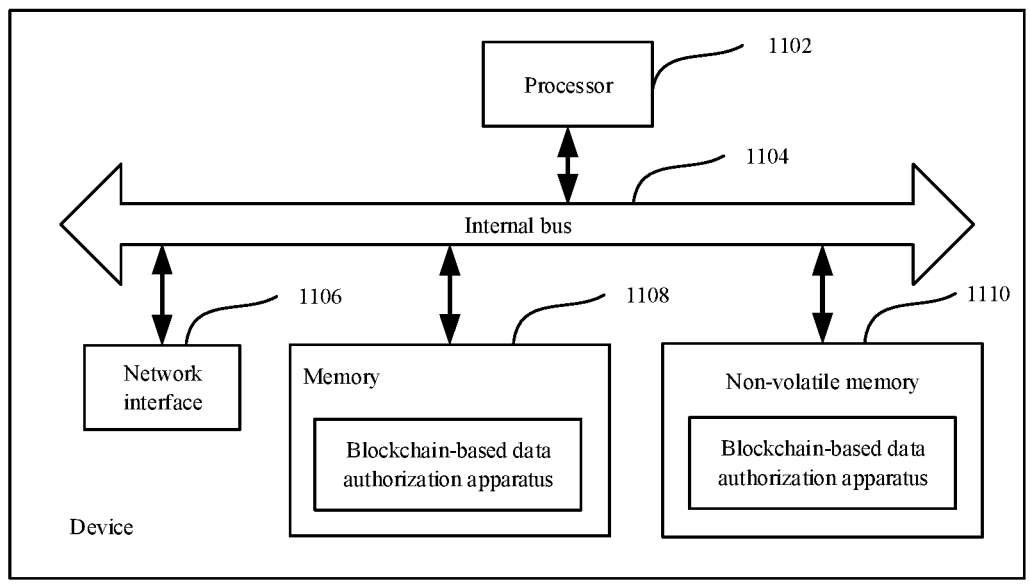
FIG. 11 is a schematic structural diagram illustrating another device, according to an example implementation.

FIG. 11 is a schematic structural diagram illustrating a device, according to an example implementation. As shown in FIG. 11, in terms of hardware, the device includes a processor 1102, an internal bus 1104, a network interface 1106, a memory 1108, and a non-volatile memory 1110, and certainly can further include other hardware needed by services. The processor 1102 reads a corresponding computer program from the non-volatile memory 1110 into the memory 1108 and then runs the corresponding computer program, so as to form a blockchain-based data authorization apparatus in terms of logic. Certainly, in addition to software implementation, one or more implementations of the present specification do not exclude other implementations, for example, a logical device or a combination of hardware and software. In other words, an execution body of the following processing procedure is not limited to each logical unit, and can also be hardware or a logical device.

Figure 12:
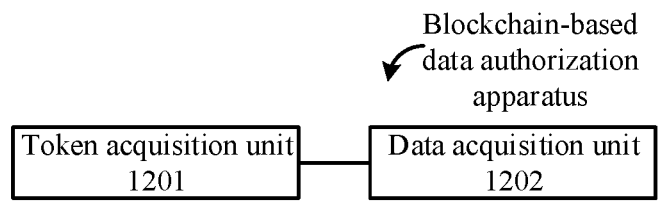
FIG. 12 is a block diagram illustrating another blockchain-based data authorization apparatus, according to an example implementation.

As shown in FIG. 12, in terms of software implementation, the blockchain-based data authorization apparatus can include the following: a token acquisition unit 1201, configured to enable a privacy computing platform to obtain an authorization token provided by a data user, where the authorization token is issued by a data authorization smart contract in a blockchain to the data user, to indicate that the data user is authorized for target data held by a data owner; and a data acquisition unit 1202, configured to enable the privacy computing platform to obtain the target data, so as to return at least one of the target data and an operation result obtained after a predetermined operation is performed on the target data to the data user.

Optionally, the data acquisition unit 1202 is specifically configured to: enable the privacy computing platform to obtain encrypted target data from a blockchain node, where the encrypted target data is obtained by encrypting the target data by using a public key of the data owner; and enable the privacy computing platform to decrypt the encrypted target data by using a hosted private key of the data owner to obtain the target data.

Optionally, the blockchain node stores a digital digest of the target data, the target data is stored through a channel off the blockchain by the data owner, and the data acquisition unit 1202 is specifically configured to: enable the privacy computing platform to provide the digital digest of the target data to the channel off the blockchain; and enable the privacy computing platform to receive the target data returned by the channel off the blockchain.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet, a wearable device, or any combination of these devices.

In a typical configuration, a computer includes one or more processors (CPU), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD) or another optical storage, a cassette tape, a magnetic disk storage, a quantum memory, a storage medium based on grapheme, another magnetic storage device, or any other non-transmission medium. The computer storage medium can be used to store information that can be accessed by the computing device. Based on the definition in the present specification, the computer readable medium does not include transitory media such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

Specific implementations of the present specification are described above. Other implementations fall within the scope of the appended claims. In some situations, the actions or steps described in the claims can be performed in an order different from the order in the implementations and the desired results can still be achieved. In addition, the process depicted in the accompanying drawings does not necessarily need a particular execution order to achieve the desired results. In some implementations, multi-tasking and concurrent processing is feasible or can be advantageous.

Terms used in one or more implementations of the present specification are merely used to describe specific implementations, and are not intended to limit the one or more implementations of the present specification. The terms "a" and "the" of singular forms used in one or more implementations of the present specification and the appended claims are also intended to include plural forms, unless otherwise specified in the context clearly. It should be further understood that the term "and/or" used in the present specification indicates and includes any or all possible combinations of one or more associated listed items.

It should be understood that although terms "first", "second", "third", etc. can be used in one or more implementations of the present specification to describe various types of information, the information is not limited to these terms. These terms are only used to differentiate between information of the same type. For example, without departing from the scope of one or more implementations of the present specification, first information can also be referred to as second information, and similarly, the second information can be referred to as the first information. Depending on the context, for example, the word "if" used here can be explained as "while", "when", or "in response to determining".

The previous descriptions are only example implementations of one or more implementations of the present specification, but are not intended to limit the one or more implementations of the present specification. Any modification, equivalent replacement, improvement, etc. made without departing from the spirit and principle of the one or more implementations of the present specification shall fall within the protection scope of the one or more implementations of the present specification.

What is claimed is:

1. A computer-implemented method comprising:
receiving, by a blockchain node and from a data user, a data acquisition transaction for obtaining target data possessed by a data owner;
invoking, by the blockchain node, a data interface of a smart contract responsive to receiving the data acquisition transaction, then writing an authorization request event for the data acquisition transaction into a transaction log that is monitored by the data owner and the data user;
based on invoking the data interface of the smart contract, determining, by the blockchain node, that the data user is authorized to obtain the target data;
generating, by the blockchain node, an authorization token in response to determining that the data user is authorized to obtain the target data;
providing, by the blockchain node, the authorization token for the data acquisition transaction to the data user, comprising adding, by the blockchain node, the authorization token for the data acquisition transaction to the transaction log that is monitored by the data user and the data owner, wherein the authorization token is sent by the data user to a privacy computing platform for use in obtaining the target data from the data owner and sending one or more of the target data and a computational result of one or more predetermined computational operations performed based on the target data to the data user;
invoking, by the blockchain node, a request interface defined in the smart contract to cause the smart contract to write the authorization request event into the transaction log; and
invoking, by the blockchain node, an authorization interface defined in the smart contract based on an authorization confirmation transaction submitted by the data owner to cause the smart contract to mark the data user as an authorized user.

2. The method according to claim 1, wherein the smart contract comprises a list of authorized users including the data user and determining that the data user is authorized to obtain the target data is performed based on the list of authorized users.

3. The method according to claim 1, wherein the authorization token indicates a quantity of authorizations the data user has over the target data and the smart contract includes one or more instructions to reduce the quantity of authorizations the data user has until the data user no longer has authorization.

4. The method according to claim 3, wherein the smart contract is executed to provide the target data to the data user if the target data has low data privacy level, and the smart contract is executed to provide the computational result of the one or more predetermined computational operations if the target data has high data privacy level.

5. The method according to claim 3, further comprising:
receiving, by the blockchain node, a depository transaction that includes ciphertext of the target data generated by encrypting the target data using a public key associated with the data owner; and
storing, by the blockchain node, the ciphertext of the target data, wherein the privacy computing platform hosts a private key corresponding to the public key for decrypting the ciphertext of the target data.

6. The method according to claim 3, further comprising:
encrypting, by the blockchain node, the target data in a trusted execution environment (TEE) by using a public key associated with the data owner to obtain ciphertext of the target data;
storing, by the blockchain node, the ciphertext of the target data to a database associated with the blockchain node; and
wherein invoking the smart contract is performed in the TEE after reading the ciphertext of the target data into the TEE and decrypting the ciphertext of the target data.

7. The method according to claim 6, wherein the data acquisition transaction is a ciphertext of a privacy depository transaction, and invoking the smart contract further comprises:
decrypting, by the blockchain node, the ciphertext of the privacy depository transaction in the TEE to obtain the target data.

8. The method according to claim 3, wherein the blockchain node stores a digital digest of the target data, the target data is stored by the data owner in a storage media other than a blockchain of the blockchain node, and is retrieved by another smart contract from the storage media and transferred to the smart contract to perform the one or more predetermined computational operations.

9. The method according to claim 3, wherein the authorization token comprises a temporary session key, and at least one of the target data or the computational result is encrypted to ciphertext by using the temporary session key and transmitted to the data user through the privacy computing platform.

10. The method according to claim 9, wherein the authorization token comprises a first field and a second field, and wherein the first field includes ciphertext of the temporary session key encrypted by using an encryption key associated with the data user, and the second field includes ciphertext of the temporary session key encrypted by using an encryption key associated with the privacy computing platform.

11. A computer-implemented system, comprising:
one or more computers, and
one or more computer memory devices interoperably coupled with the one or more computers and having tangible, non-transitory, machine-readable media storing one or more instructions that, when executed by the one or more computers, perform operations comprising:
receiving, by a blockchain node and from a data user, a data acquisition transaction for obtaining target data possessed by a data owner;
invoking, by the blockchain node, a data interface of a smart contract responsive to receiving the data acquisition transaction, then writing an authorization request event for the data acquisition transaction into a transaction log that is monitored by the data owner and the data user;
based on invoking the data interface of the smart contract, determining, by the blockchain node, that the data user is authorized to obtain the target data;
generating, by the blockchain node, an authorization token in response to determining that the data user is authorized to obtain the target data;
providing, by the blockchain node, the authorization token for the data acquisition transaction to the data user, comprising adding, by the blockchain node, the authorization token for the data acquisition transaction to the transaction log that is monitored by the data user and the data owner, wherein the authorization token is sent by the data user to a privacy computing platform for use in obtaining the target data from the data owner and sending one or more of the target data and a computational result of one or more predetermined computational operations performed based on the target data to the data user;
invoking, by the blockchain node, a request interface defined in the smart contract to cause the smart contract to write the authorization request event into the transaction log; and
invoking, by the blockchain node, an authorization interface defined in the smart contract based on an authorization confirmation transaction submitted by the data owner to cause the smart contract to mark the data user as an authorized user.

12. The computer-implemented system according to claim 11, wherein the smart contract comprises a list of authorized users including the data user and determining the data user is authorized to obtain the target data is performed based on the list of authorized users.

13. The computer-implemented system according to claim 11, wherein the authorization token indicates a quantity of authorizations the data user has over the target data and the smart contract includes one or more instructions to reduce the quantity of authorizations the data user has until the data user no longer has authorization.

14. The computer-implemented system according to claim 11, wherein the smart contract is executed to provide the target data to the data user if the target data has low data privacy level, and the smart contract is executed to provide the computational result of the one or more predetermined computational operations if the target data has high data privacy level.

15. The computer-implemented system according to claim 11, further comprising:
receiving, by the blockchain node, a depository transaction that includes ciphertext of the target data generated by encrypting the target data using a public key associated with the data owner; and
storing, by the blockchain node, the ciphertext of the target data, wherein the privacy computing platform hosts a private key corresponding to the public key for decrypting the ciphertext of the target data.

16. The computer-implemented system according to claim 11, further comprising:
encrypting, by the blockchain node, the target data in a trusted execution environment (TEE) by using a public key associated with the data owner to obtain ciphertext of the target data;
storing, by the blockchain node, the ciphertext of the target data to a database associated with the blockchain node; and
wherein invoking the smart contract is performed in the TEE after reading the ciphertext of the target data into the TEE and decrypting the ciphertext of the target data.

17. The computer-implemented system according to claim 16, wherein the data acquisition transaction is a ciphertext of a privacy depository transaction, and invoking the smart contract further comprises:
decrypting, by the blockchain node, the ciphertext of the privacy depository transaction in the TEE to obtain the target data.

18. A non-transitory, computer-readable medium storing one or more instructions executable by a computer system to perform operations comprising:
receiving, by a blockchain node and from a data user, a data acquisition transaction for obtaining target data possessed by a data owner;
invoking, by the blockchain node, a data interface of a smart contract responsive to receiving the data acquisition transaction, then writing an authorization request event for the data acquisition transaction into a transaction log that is monitored by the data owner and the data user;
based on invoking the data interface of the smart contract, determining, by the blockchain node, that the data user is authorized to obtain the target data;
generating, by the blockchain node, an authorization token in response to determining that the data user is authorized to obtain the target data;
providing, by the blockchain node, the authorization token for the data acquisition transaction to the data user, comprising adding, by the blockchain node, the authorization token for the data acquisition transaction to the transaction log that is monitored by the data user and the data owner, wherein the authorization token is sent by the data user to a privacy computing platform for use in obtaining the target data from the data owner and sending one or more of the target data and a computational result of one or more predetermined computational operations performed based on the target data to the data user;
invoking, by the blockchain node, a request interface defined in the smart contract to cause the smart contract to write the authorization request event into the transaction log; and invoking, by the blockchain node, an authorization interface defined in the smart contract based on an authorization confirmation transaction submitted by the data owner to cause the smart contract to mark the data user as an authorized user.

\* \* \* \* \*

UNITED STATES PATENT AND TRADEMARK OFFICE
CERTIFICATE OF CORRECTION

PATENT NO. : 11,252,166 B2
APPLICATION NO. : 16/779488
DATED : February 15, 2022
INVENTOR(S) : Wei et al.

It is certified that error appears in the above-identified patent and that said Letters Patent is hereby corrected as shown below:

In the Claims

Column 26, Line 22, In Claim 4, delete "claim 3," and insert -- claim 1 --.

Column 26, Line 28, In Claim 5, delete "claim 3," and insert -- claim 1 --.

Column 26, Line 37, In Claim 6, delete "claim 3," and insert -- claim 1 --.

Column 26, Line 55, In Claim 8, delete "claim 3," and insert -- claim 1 --.

Column 26, Line 62, In Claim 9, delete "claim 3," and insert -- claim 1 --.

Signed and Sealed this
Thirty-first Day of May, 2022

Katherine Kelly Vidal
*Director of the United States Patent and Trademark Office*